United States Patent [19]

Figueras et al.

[11] Patent Number: 4,953,455
[45] Date of Patent: Sep. 4, 1990

[54] FOOD WRAPPER APPARATUS

[75] Inventors: Rosalino Figueras; George Micko, both of Springfield, Ill.

[73] Assignee: EFG Foods, Inc., Springfield, Ill.

[21] Appl. No.: 163,241

[22] Filed: Feb. 29, 1988

Related U.S. Application Data

[63] Continuation-in-part of Ser. No. 101,105, Sep. 25, 1987, abandoned.

[51] Int. Cl.$^5$ .......................... A21C 9/00; A23P 1/00
[52] U.S. Cl. ..................... 99/450.6; 53/215; 53/516; 99/450.7
[58] Field of Search ............. 99/352, 353, 355, 450.1, 99/450.2, 450.4, 450.5, 450.6, 450.7; 425/383, 363, 373, 130; 426/501, 502, 516, 297, 373, 497, 512; 53/116, 514, 209, 215, 211, 516

[56] References Cited

U.S. PATENT DOCUMENTS

| | | | |
|---|---|---|---|
| 3,690,248 | 9/1972 | Schafer | 99/450.6 |
| 4,047,478 | 9/1977 | Trostmann et al. | 99/450.6 |
| 4,388,059 | 6/1983 | Ma | 425/112 |
| 4,457,225 | 7/1984 | Bakker | 426/502 |
| 4,517,785 | 5/1985 | Masuda | 53/116 |
| 4,608,919 | 9/1986 | Prows et al. | 99/450.6 |
| 4,637,304 | 1/1987 | Suzuki | 99/450.2 |
| 4,687,670 | 8/1987 | Rodriguez | 426/297 |
| 4,691,627 | 9/1987 | Roberts | 99/450.7 |
| 4,842,879 | 6/1989 | Ek | 426/297 |
| 4,854,228 | 8/1989 | Ferrero | 99/450.1 |

FOREIGN PATENT DOCUMENTS 2428403  2/1980  France ............................... 99/450.7

Primary Examiner—Timothy F. Simone
Attorney, Agent, or Firm—Armstrong, Nikaido, Marmelstein, Kubovcik & Murray

[57]  ABSTRACT

A food wrapper apparatus is disclosed having a base mounted onto a work table, a support member mounted onto said base, an upper member mounted onto said support member, a roller road cooperating with a guiding film on said upper member for enclosing food with a food wrapper, and at least one cutter for cutting the fully enclosed food into multiple pieces which are accommodated in a pan beneath the base. The food being wrapper results in the rapid and efficient production of a delicacy, such as lumpia, egg roll, or the like.

13 Claims, 5 Drawing Sheets

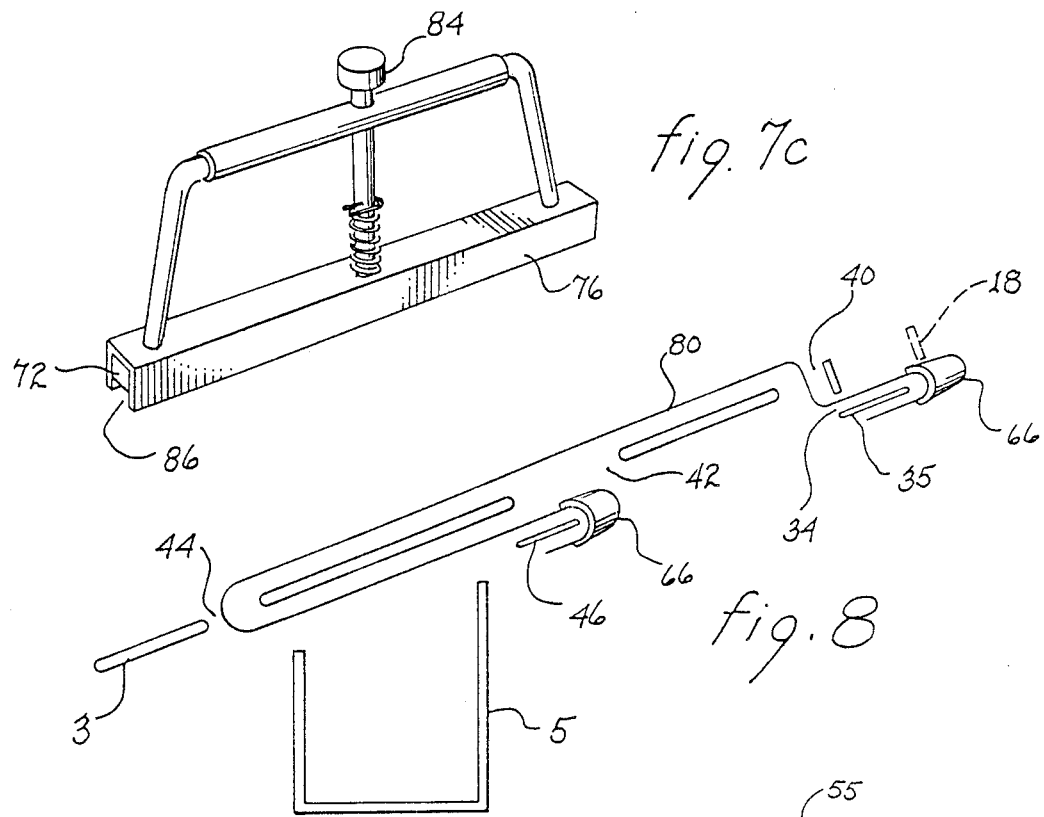
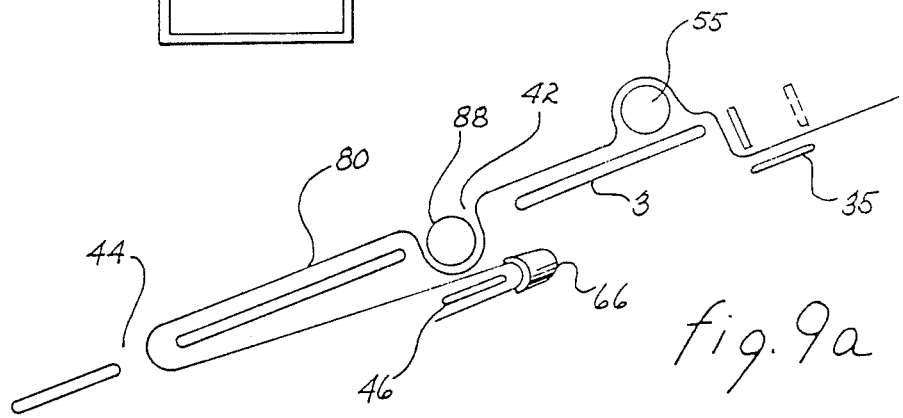
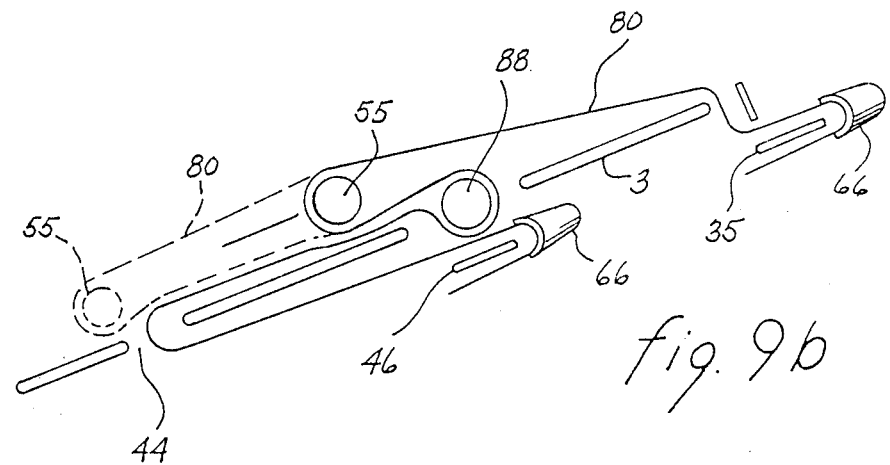

FOOD WRAPPER APPARATUS

This application is a continuation-in-part of Application Ser. No. 101,105, filed Sept. 25, 1987, now abandoned.

BACKGROUND OF THE INVENTION

This invention generally relates to an apparatus used for wrapping a film around food. More particularly, this invention relates to an apparatus for wrapping a mixture of meat and vegetables resulting in the production of a finished product, such as, a "lumpia" (i.e., a Philippine style egg roll), egg roll, or the like.

Often, the making of a lumpia or an egg roll requires a significant amount of patience, especially in the final production step of wrapping the mixture of meat and vegetables. Not only must there be a reasonably cut or sized food wrapping material, an appropriate amount of filling, i.e., the mixture of meat and vegetables to be wrapped, should be provided as well. In the mass production and sale of lumpias or egg rolls, time and accuracy are of the essence in order to satisfy large orders which is typically required since the lumpia or egg roll, due to size and considerably appetizing taste, is a fast consuming food product.

Accordingly, there is a need for a food wrapper apparatus and a method of operating thereof as in the instant invention which can provide the essential rapid and efficient production of a significant number of lumpias or egg rolls. Such a food wrapper apparatus should be operated so as to permit a user to rapidly and easily produce a significant number of lumpias or egg rolls. Moreover, the food wrapper should be made of durable and rigid materials which can be easily and efficiently cleaned on a regular basis in compliance with governmental regulations. Similarly, it is desirable to have the food wrapper easily mounted on a work table and easily transported and stored when not in use. The food wrapper should be rigidly erect from a working table so as be easily and efficiently accessible to a user.

SUMMARY OF THE INVENTION

It is an object of this invention to provide a food wrapper apparatus and a method of operating thereof.

It is another object of this invention to provide a food wrapper apparatus which can be efficiently operated in order to rapidly and efficiently produce a significant number of lumpias or egg rolls.

It is another object of this invention to provide at least one food wrapper apparatus or a plurality thereof which can be easily and efficiently mounted on a working table.

It is still another object of this invention to provide a food wrapper apparatus which can be made easily accessible to a user when in use.

It is yet another object of this invention to provide a food wrapper apparatus which can be easily transported and stored when not in use.

It is a further object of this invention to provide a food wrapper apparatus which is made of durable and rigid materials which can be easily and efficiently cleaned on a regular basis in compliance with governmental regulations.

It is further object of this invention to accomplish the above by a food wrapper apparatus which will be sufficiently rigid when in use, durable in construction, inexpensive and easy to manufacture.

In accordance with one embodiment of this invention, a food wrapper apparatus for producing lumpias or egg rolls is disclosed. In this embodiment, an upper member mounts on a support member which extends above a base. The base is then seated on a work table. The upper member has slots passing therethrough for guiding a film of guiding material, such as a plastic guiding film or the like. The upper member also has a U-shaped upper portion for accommodating therein a roller rod during the enclosing or wrapping of at least one lumpia or egg roll by a food wrapping material. Operably coupled to the base and support member is at least one pair of scissors which can catch a fully wrapped lumpia or egg roll for effectively cutting thereof to a plurality of lumpias or egg rolls at desirable sizes.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 7c is a perspective view of the meat filling dispenser in a non-dispensing position.

FIG. 8 is a schematic view of the manner in which a film of guiding material is positioned on the upper member through slots of the upper member, and mounted thereto by the longitudinal clips.

FIGS. 9a through 9d are schematic views illustrating a step-by-step operation of the manner in which the food wrapper apparatus of the instant invention is used.

DESCRIPTION OF THE PREFERRED EMBODIMENTS

Figure 1:
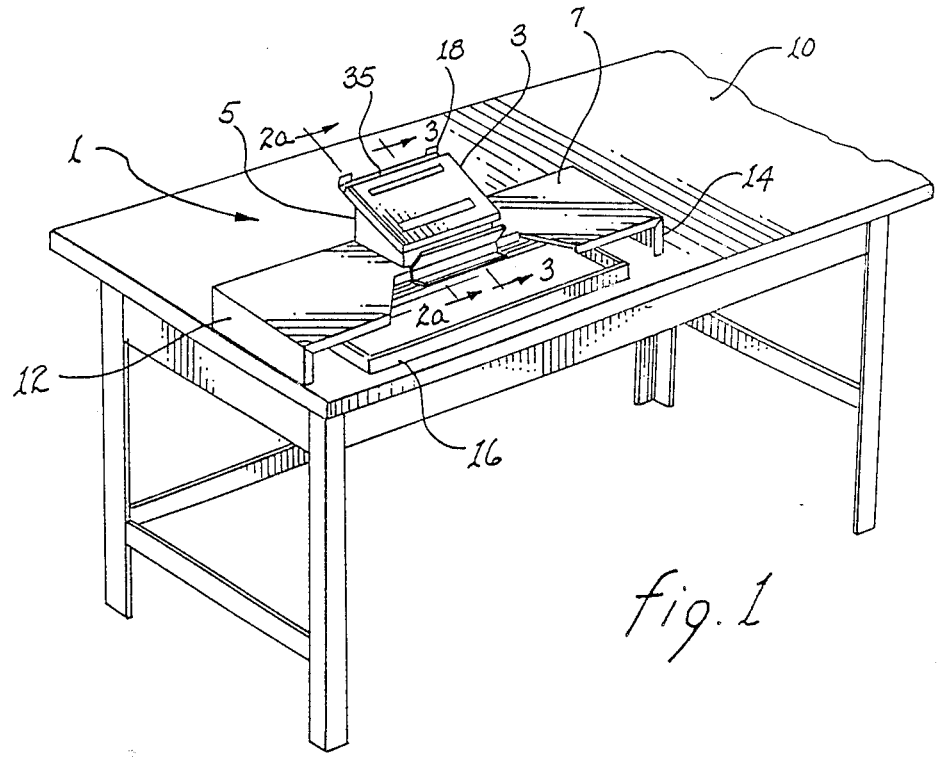
FIG. 1 is a perspective view of an embodiment of a food wrapper apparatus in accordance with the present invention showing the upper member mounted on a support member extending above a base which seats on an associated work table.

FIG. 1 is a perspective view of a food wrapper apparatus, generally designated by reference number 1, showing the apparatus ready for use. The food wrapper apparatus 1 has an upper member 3 mounted on a support member 5 which in turn extends over a base 7. The base 7 sits on a portion of a work table 10. The base 7 has legs 12, 14 which allows the base 7 to sit on the work table 10 above a holding pan 16. The work table 10 is preferably large enough to permit or accommodate thereon a plurality of food wrapper apparatuses 1 of the present invention, if desired.

As shown in FIG. 2, the upper member 3 has a generally U-shaped upper portion 18 which partially extends along the upper portion of the upper member 3. The U-shaped portion 18 is used for accommodating therein a roller rod 20 which will later be more fully discussed. A pair of scissors 22, preferably made of stainless steel, is operably mounted onto the support member 5 by an upwardly extending member 24 having a lip member 26 where the scissor 22 sits when in use. Another upwardly extending member 28, preferably L-shaped, is attached to the base 7 for integrally mounting thereon another portion of the scissor 22 as shown. The scissor 22 has an upwardly extending member 30, integral or attached thereto, which is accessible for a user when the need to manipulate or operate the scissor 22 arises. The upwardly extending member 30 is resiliently coupled to a portion of the scissor 22 by a spring 32, as shown in FIG. 2.

Figure 2A:
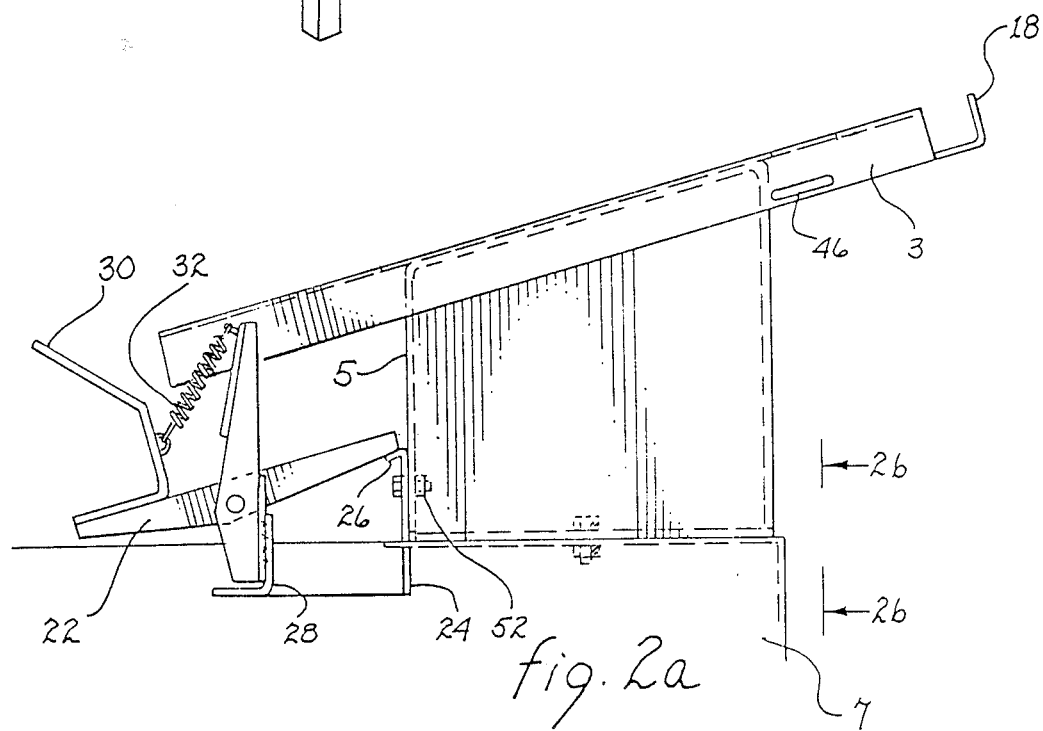
FIG. 2 is a cross-sectional view taken along line 2a—2a of FIG. 1 showing an upper member with a U-shaped upper portion, the support member, base and at least one pair of scissors operably mounted onto the support member and the base.
FIG. 2b is a side elevational view taken along line 2b—2b of FIG. 2a showing the manner in which the support member is coupled to the base.
Figure 2B:
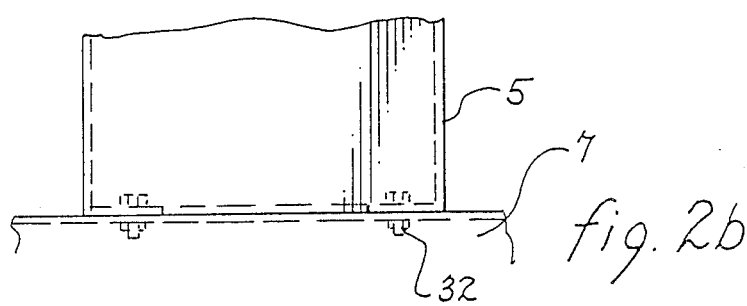

FIG. 2b more closely illustrates the manner in which the support member 5 is coupled by bolts 32 to the base 7.

Figure 3:
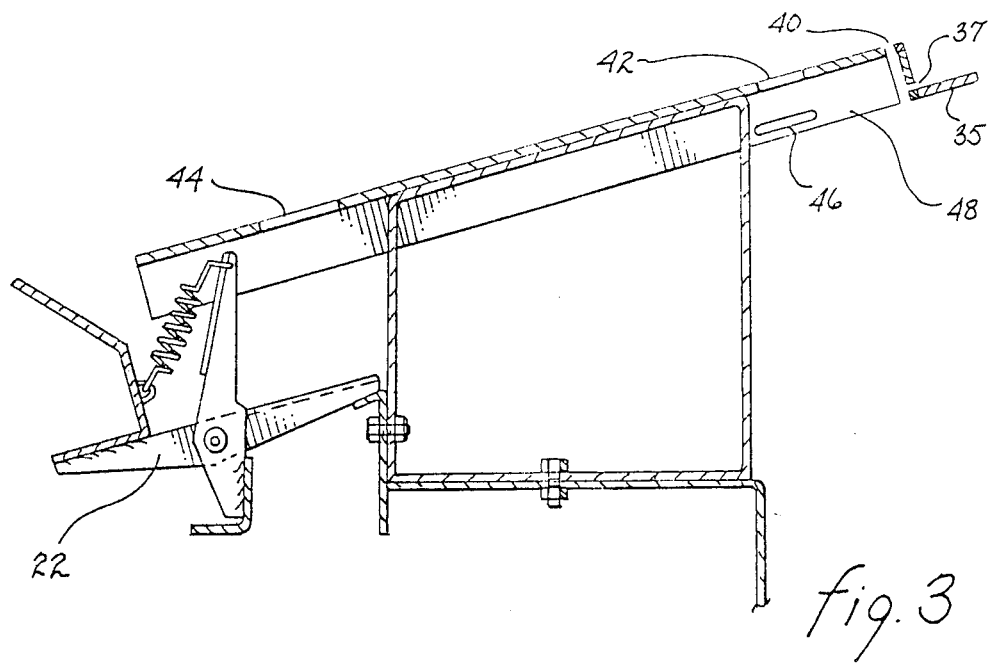
FIG. 3 is a cross-sectional view taken along line 3—3 of FIG. 1 showing the manner in which the upper member is configured at the center portion thereof.

FIG. 3 shows the manner in which the upper member 3 is configured at the upper center portion 35 having elongated slot 37 abutting thereto. As further seen in FIG. 3, the U-shaped portion 18 of the upper member 3 does not extend through the center portion 35. Passing through the upper member 3 are upper, middle and lower slots 40, 42, 44, respectively. Below the middle slot 42, as shown in FIG. 3, is an elongated bar 46 which is attached to opposing sides 48 of the upper member 3. The lower slot 44 is preferably located immediately above the plurality of scissors 22. The functions of the upper center portion 35 and slots 37, 40, 42, 44 will be apparent when describing the operation of the instant invention.

Figure 4:
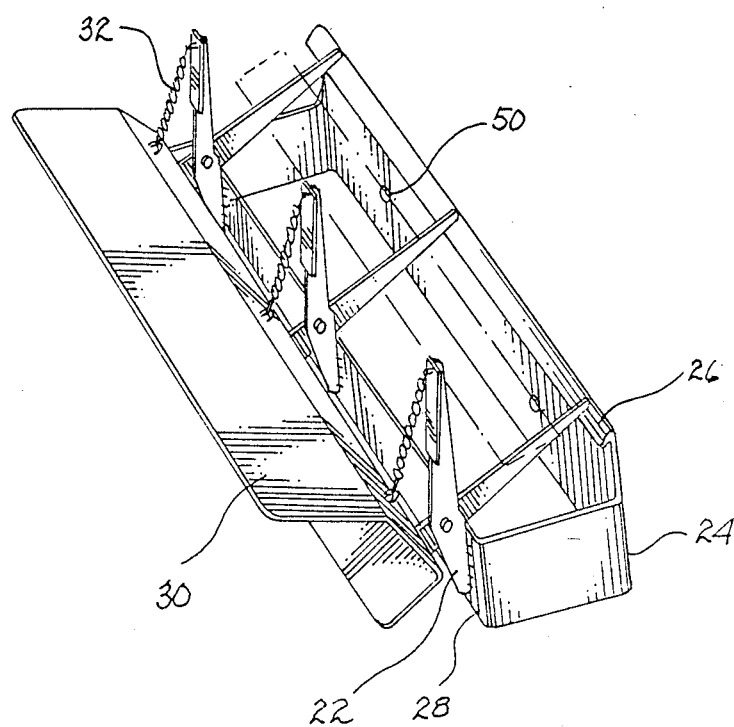
FIG. 4 is top perspective view of a plurality of pairs of scissors.

FIG. 4 illustrates the manner in which a plurality of scissors 22 can be provided in series with the various portions previously discussed for FIG. 2a. The upwardly extending member 24 preferably has at least one aperture 50 passing therethrough for accommodating therein a bolt 52 (see, FIG. 2a) for fastening the upwardly extending member 24 to the support member 5.

Figure 5A:
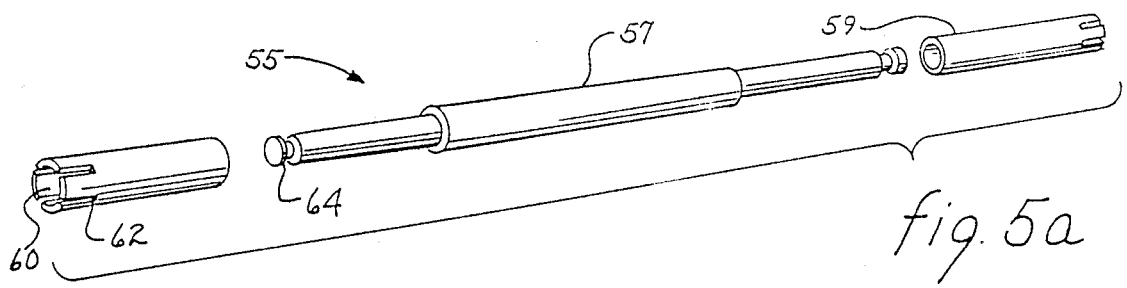
FIG. 5a is an exploded perspective view of a roller rod.
Figure 5B:
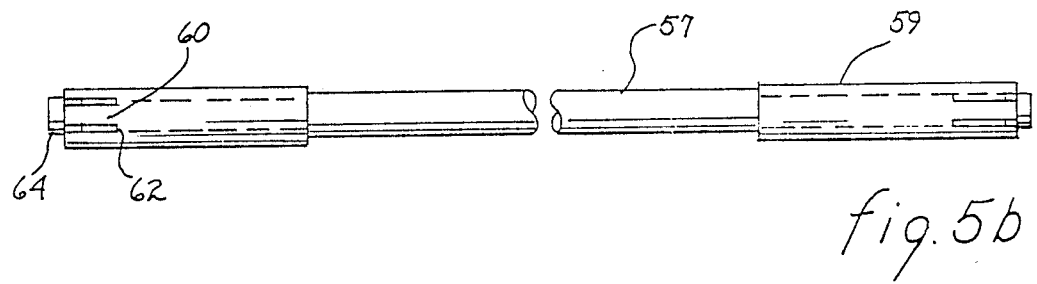
FIG. 5b is a side elevational view of a fully assembled roller rod ready for use.

FIG. 5a illustrates a roller rod, generally referred to by reference numeral 55, having a middle rod 57 with end tubes 59. The ends of the end tubes 59 preferably have integral protruding members 60 abutting slots 62. Each of the ends of the middle rod 57 has a knob-like member 64 for catching the integral protruding member 60 when the roller rod 55 is fully assembled as shown in FIG. 5b.

Figures 6A, 6B:
FIG. 6a is a front elevational view of a longitudinal clip.
FIG. 6b is a side elevational view of the longitudinal clip.

FIG. 6a illustrate an elongated clip 66 having a U-shaped configuration as shown in FIG. 6b. The clip 66 removably attaches a film of guiding material 80 to the upper center portion 35 and the elongated bar 46, as described more fully below.

Figures 7A, 7B:
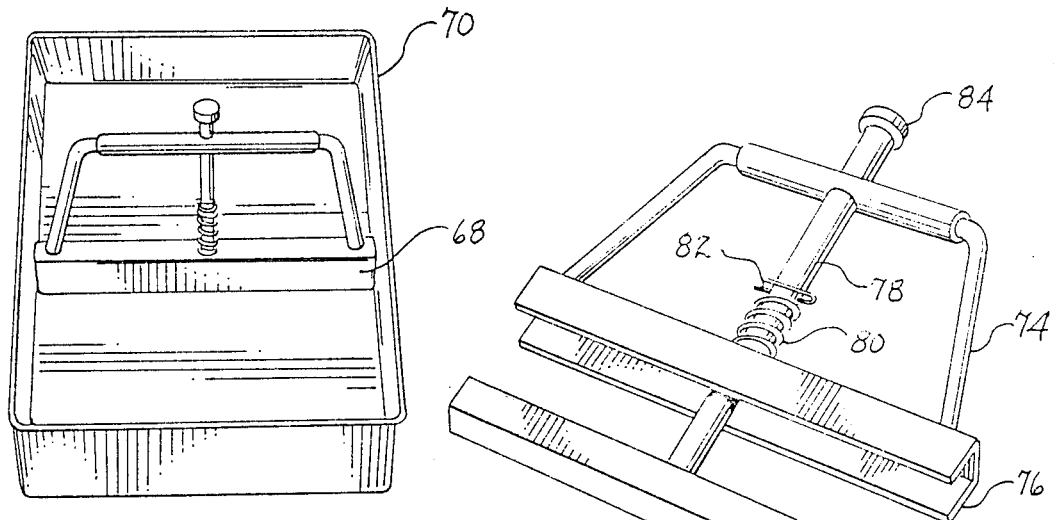
FIG. 7a is a front perspective view of a meat filling dispenser accommodated within a meat filling container.
FIG. 7b is an exploded perspective view of the meat filling dispenser.

FIG. 7a shows a meat filling dispenser 68 accommodated within a meat filling container 70 which holds the meat filling to be wrapped. Further illustrated in FIG. 7b is the meat filling dispenser 68 shown in its dispensing position having a block member 72, preferably made of plastic material which can be easily cleaned and in compliance with sanitary regulations. The dispenser 68 further has a handle 74 and a preferably U-shaped enclosing member 76 coupled thereto for accommodating therein the block member 72 and meat filling (not shown). The dispenser 68 has an elongated member 78 passing through the handle 74 for sliding therethrough. A spring 80 around the member 78 is pinned at one end with a pin 82. The pin 82 has a side passing through an aperture (not shown) passing through the elongated member 78. A cap 84 may be removable from the elongated member 78. FIG. 7c shows the meat filling dispenser 68 in a non-dispensing position. When the block member 72 is fully drawn into the enclosing member 76, an elongated space 86 within the enclosing member 76 is provided for accommodating the meat filling (not shown) from the container 70.

When the dispenser 68 is used, the block member 72 is initially drawn into the enclosing member 76 and the dispenser 68 is preferably pushed in a side-to-side motion onto the meat filling in the container 70 for an even accumulation of meat filling into the enclosing member 76. The meat filling is dispensed from the enclosing member 76 by pushing the cap 84 towards the handle 74 for allowing the block member 72 to push out the meat filling out of the enclosing member 76 onto the food wrapping material 88 in a manner which will is further discussed below.

The manner in which the food wrapper apparatus 1 operates is hereinafter described. Referring first to the schematic view of FIG. 8, the guiding film of material 80, such as plastic film, cellophane, or the like is initially guided through in the manner shown in FIG. 8.

One end of the guiding film 80 is attached to the elongated bar 46 by the elongated clip 66 as shown. The guiding film 80 then traverses through the lower elongated slot 44 from below the upper member 3 and into the upper elongated slot 40 from above the upper member 3. The guiding film 80 is then passed through the elongated slot 37 and then attached to the center portion 35 of the upper member 3.

The tension of the guiding film 80 is initially calibrated or positioned in the manner hereinafter described for FIGS. 9a to 9b. The elongated clip 66 is initially taken out from the center portion 35 in order to allow ease of tension for the guiding film 80 for initial calibration or positioning. The roller rod 55 is placed beneath the guiding film 80 while a typical rod, either shallow or solid, is placed over the guiding film 80 through the middle elongated slot 42 and rested on the elongated bar 46, shown in FIG. 9a.

As illustrated in FIG. 9b, the roller rod 55 is pulled up over the rod 88 towards the arrow, as shown, taking along with it a portion of the guiding film 80. The roller rod 55 (shown in dashed lines) is placed in a position just below the lower elongated slot 44. The end of the guiding film 80 is thereafter attached to the center portion 35 of the upper member 3 with an elongated clip 66.

After the guiding film 80 has been properly positioned or calibrated in the manner discussed above, the apparatus of the instant invention is ready for wrapping meat filling 90.

Figure 9C:
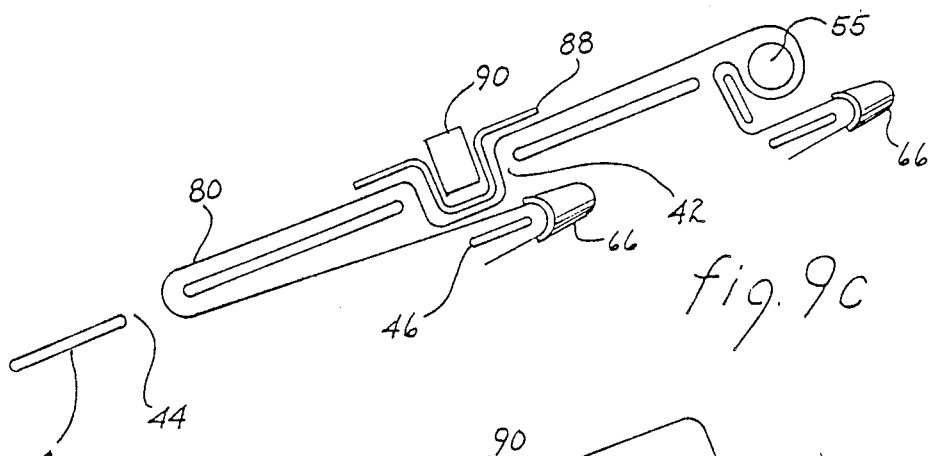

As illustrated in the schematic view in FIG. 9c, the roller rod 55 is positioned on the center portion 35 of the upper member 3. Food wrapping material 88, typically made of flour and easily accessible in food markets, is then placed on the portion of the guiding film 80 above the middle elongated slot 42. The dispenser 68 having meat filling in the enclosing member 76 is then placed on the wrapping material 88.

Figure 10:
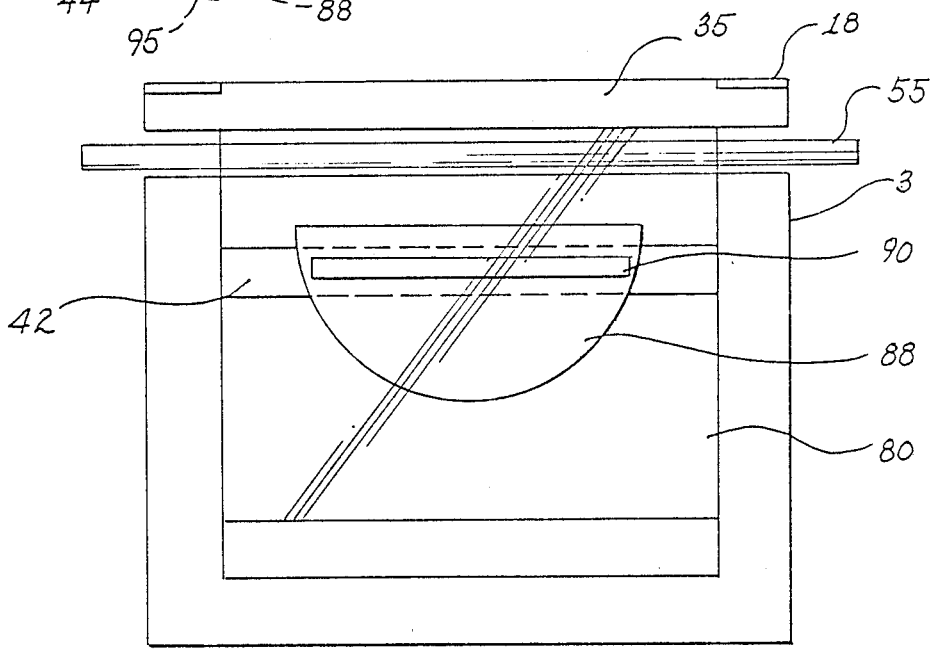
FIG. 10 is a top elevational schematic view of the upper member having a food wrapping material and meat filling thereon ready to be wrapped.

FIG. 10 shows as top elevational schematic view of the arrangement shown in FIG. 9c. The wrapping material 88 is preferably cut in a half-circle shape, as shown in FIG. 10, while the meat filling 90 in an elongated form is placed thereon.

Figure 9D:
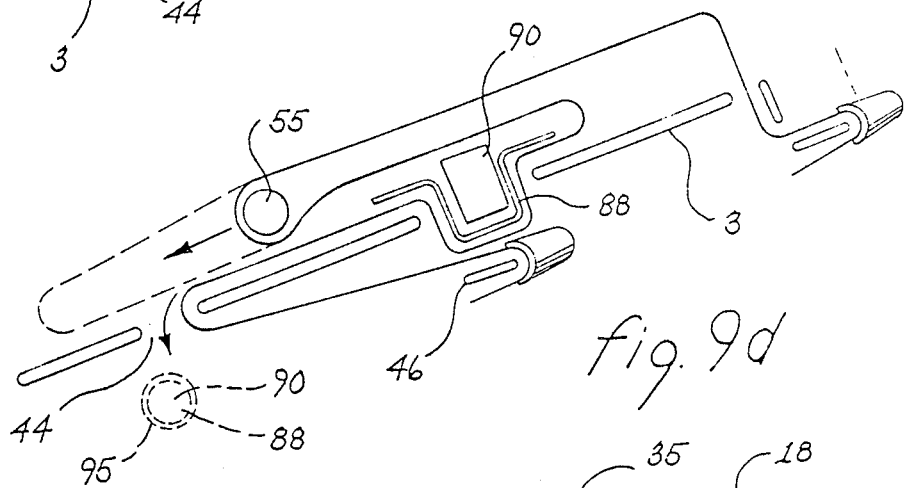

As further illustrated in FIG. 9d, the roller rod 55 is pulled up over the meat filling 90 and rolled in the direction shown in the arrow. While the roller rod 55 is rolled in the direction of the arrow, the guiding film 80 portion beneath the wrapping material 88 is rolled around the meat filling 90. While the roller rod 55 is further rolled down toward the direction of the arrow on the upper member 3, the rolled meat filling 90 with the wrapping material 88 thereon is further rolled down the upper member 3 until the fully wrapped food product (i.e., the lumpia or egg roll) 95 reaches and passes through the lower elongated slot 44. After passing through the lower elongated slot 44, the fully wrapped food product 95 then lands on the plurality of scissors 22. More particularly, the fully wrapped food product 95 lands on the portion of the scissor which is removably attached to the lip member 26 of the upwardly extending member 24 previously discussed. The upwardly extending member 30 of the scissors 22 is then pushed downward in order to cut the fully wrapped food product 95 into multiple lumpias or egg rolls. The resulting multiple lumpias or egg rolls then drop to the pan 16. If desired, food mixture, such as egg material or the like, can be brushed onto the free edge of the lumpia or egg roll for proper sealing. The lumpias or egg rolls are then packed, placed in a deep-freeze container and stored in a freezer thereafter for later consumption.

While the invention has been particularly shown and described in reference to preferred embodiments thereof, it will be understood by those skilled in the art that changes in form and details may be made therein without departing from the spirit and scope of the invention.

We claim:

1. A food wrapper apparatus, comprising:
   a base means for mounting onto a work table;
   a support member means for mounting onto said base means;
   an upper member means for mounting onto said support member means;
   a roller means for rolling on said support member means and for enclosing food with a food wrapping material entirely on said support member means; and
   at least one cutting means operably coupled to said base means for cutting wrapped food into multiple pieces.

2. The food wrapper apparatus as in claim 1, further comprising a pan means for accommodating thereon said multiple pieces of wrapped food.

3. The food wrapper apparatus as in claim 1, further comprising a guiding film for aiding in the wrapping of said food; and
   clip means for coupling said guiding film onto said upper member means.

4. The food wrapper apparatus as in claim 2, wherein said base means comprises leg means for extending said base means over said pan means.

5. The food wrapper apparatus as in claim 4, wherein a first portion of said cutting means is integrally coupled to said base means while a second portion of said cutting means is operably and removably joined to said support member means.

6. The food wrapper apparatus as in claim 5, wherein said cutting means has a handling means resiliently coupled to said second portion of said cutting means.

7. The food wrapper apparatus as in claim 6, wherein said upper member means has lower, middle and upper elongated slots passing therethrough for guiding said guiding film.

8. The food wrapper apparatus as in claim 6, wherein said upper member means has an elongated member means coupled thereto beneath said middle elongated slot for coupling said guiding film onto said upper member means with at least one of said clip means.

9. The food wrapper apparatus as in claim 8, wherein said upper member means has a partially u-shaped upper portion for coupling said guiding film thereto at least one of said clip means.

10. A food wrapper apparatus for enclosing a food wrapping material over a meat filling in order to produce at least one lumpia, comprising:
    a base member means having legs for mounting onto a work table above a pan;
    a support member means for mounting onto said base member means, wherein said support member means has an upper portion which is slanted;
    an upper member means having elongated slots passing therethrough for guiding a film of material onto said upper member means, wherein said upper member means has a generally u-shaped upper portion which partially extends along the upper portion of said upper member means for mounting said film of material thereto;
    at least one cutting means having a portion integrally coupled to said base member means and another portion operably and removably joined to said support member means, wherein said portion of said cutting means removably joined to said support member means has a handle means; and
    first and second clip means coupled to said upper member means for coupling said film of material, wherein said first clip means is coupled to an elongated member integrally attached to said upper member means beneath at least one of said elongated slots, and wherein said second clip means is coupled adjacent to said u-shaped upper portion of said upper member means.

11. The food wrapper apparatus as in claim 10, further comprising a roller rod means for operating said film of material in wrapping a food wrapper around food.

12. The food wrapper apparatus as in claim 11, wherein said food being wrapped is meat filling, and wherein a resulting wrapped food is lumpia.

13. A food wrapper apparatus, comprising:
    a base means for mounting onto a work table;
    a support member means for mounting onto said base means;
    an upper member means for mounting onto said support member means;
    a roller means for rolling on said support member means and for enclosing food with a food wrapping material;
    at least one cutting means operably coupled to said base means for cutting wrapped food into multiplied pieces;
    a guiding means which cooperates with said roller means for aiding in the wrapping of said food; and
    means for coupling said guiding means onto said upper member means.

* * * * *